United States Patent [19]

Fukumoto et al.

[11] Patent Number: 4,753,125

[45] Date of Patent: Jun. 28, 1988

[54] DRIVER UNIT FOR USE IN WINDOW REGULATORS

[75] Inventors: Ryoichi Fukumoto, Nagoya; Daiichi Shiraishi, Seto; Eiji Iwasaki, Toyota, all of Japan

[73] Assignees: Aisin Seiki Kabushiki Kaisha, Kariya; Toyota Jidosha Kabushiki Kaisha, Toyota, both of Japan

[21] Appl. No.: 78,011

[22] Filed: Jul. 21, 1987

Related U.S. Application Data

[63] Continuation of Ser. No. 741,478, Jun. 5, 1985, abandoned.

[30] Foreign Application Priority Data

| | | | |
|---|---|---|---|
| Jun. 6, 1984 | [JP] | Japan | 59-116116 |
| Jun. 6, 1984 | [JP] | Japan | 59-83831[U] |
| Jun. 6, 1984 | [JP] | Japan | 59-83832[U] |

[51] Int. Cl.[4] ..... F16C 1/10; E05F 11/48

[52] U.S. Cl. ..... 74/504; 74/501 R; 74/501.5 R; 49/352

[58] Field of Search ..... 74/504, 505, 506, 501.5, 74/501 R, 501 M, 501 A; 49/352, 353, 348, 349, 353, 227, 375

[56] References Cited

U.S. PATENT DOCUMENTS

| | | | |
|---|---|---|---|
| 1,561,749 | 11/1925 | Simpson | 49/352 |
| 1,658,693 | 2/1928 | Smith | 49/352 |
| 1,930,728 | 10/1933 | Ringling | 403/197 |
| 2,429,313 | 10/1947 | Gilbert | 267/156 |
| 2,432,799 | 12/1947 | Rappl | 49/352 X |
| 2,607,581 | 8/1952 | Love et al. | 74/500.5 X |
| 2,665,900 | 1/1954 | Begerow | 248/214 X |
| 2,721,245 | 10/1955 | Arisman et al. | 248/27.3 X |
| 3,110,380 | 11/1963 | Meyer et al. | 188/82.6 X |
| 3,288,254 | 11/1966 | Replogle | 188/82.7 |
| 3,334,443 | 8/1967 | Eskra et al. | 49/349 |
| 3,451,668 | 6/1969 | Robinson | 411/108 X |
| 4,095,370 | 6/1978 | Muehling | 49/352 |
| 4,216,624 | 8/1980 | Blankenburg et al. | 49/352 |
| 4,237,656 | 12/1980 | Hess et al. | 49/352 |
| 4,306,378 | 12/1981 | Fukura et al. | 49/352 |
| 4,313,622 | 2/1982 | Suzuki et al. | 74/501 R |
| 4,440,354 | 4/1984 | Kobayashi et al. | 49/352 X |
| 4,503,732 | 3/1985 | Schust | 49/352 X |
| 4,628,759 | 12/1986 | Kobayashi et al. | 49/352 X |

FOREIGN PATENT DOCUMENTS

| | | | |
|---|---|---|---|
| 3000199 | 7/1981 | Fed. Rep. of Germany | 49/352 |
| 3000635 | 7/1981 | Fed. Rep. of Germany | 49/352 |
| 663101 | 8/1929 | France | 49/353 |
| 49-2336 | 1/1974 | Japan . | |
| 58-69684 | 5/1983 | Japan . | |
| 996462 | 6/1965 | United Kingdom | 74/502.2 |
| 2062746 | 5/1981 | United Kingdom | 49/352 |

*Primary Examiner*—Gary L. Smith
*Assistant Examiner*—Rodney M. Lindsey
*Attorney, Agent, or Firm*—Finnegan, Henderson, Farabow, Garrett & Dunner

[57] ABSTRACT

A driver unit for use in a window regulator for raising and lowering a panel of window glass has a drum case to be mounted on a fixed member such as a door panel, a drum rotatably supported in the drum case for winding a wire thereon and feeding the wire therefrom upon rotation thereof, the drum having an axial shank, a spiral spring having one end engaging the shank, and a spring cover supported on the drum case and accommodating the spiral spring therein, the other end of the spiral spring being fixed to the spring cover, the shank of the drum being rotatably supported on the spring cover. The spring cover is securely locked on the drum case by a reliable locking arrangement which can easily be assembled.

5 Claims, 10 Drawing Sheets

DRIVER UNIT FOR USE IN WINDOW REGULATORS

This application is a continuation, of application Ser. No. 741,478, filed June 5, 1985 now abandoned.

BACKGROUND OF THE INVENTION

1. Field of the Invention

The present invention relates to a driver unit for use in a window regulator of an automobile.

2. Description of the Prior Art

Window regulators or window-winding mechanisms for use in automobiles include a link mechanism or wire mounted in a door and coupled to a bracket fixed to a panel of window glass attached to an automobile door. When raising or lowering the window glass, the link mechanism or wire is moved by a motor-driven or manually-operated driver unit to impart vertical movement to the bracket. The window regulator employing the wire for lifting and lowering the window glass is disclosed in, e.g., Japanese Utility Model Application Laid-Open No. 58-69684.

Some automobile doors have window frames or sashes in which window glass panels are movably supported. When the window glass is fully closed in a sash, the upper, front and rear edges of the glass are held in position by the sash. When the glass is moved upwardly or downwardly, its front and rear edges are supported by the sash in the longitudinal and transverse directions of the automobile.

Since the front sash member of a front door is inclined along the front pillar of the automobile body, the front edge of the front window glass supported and guided by the sash is of a reduced length. The front window glass is prevented from rotating in a plane along its surface by means of a slider secured to a lower portion of the window glass and slidably supported in the groove of a rail attached to an inner panel of the front door.

If the aforesaid construction were incorporated in a sashless door, the rigidity with which the glass is supported would be insufficient because the supported length of the slider would be too small. This would lead to certain drawbacks, namely that the upper and side edges of the glass could not be completely sealed against the automobile body, resulting in leakage of rain water and whistling caused by wind. In doors with larger window glass areas for a wider field of view, the belt line would be lowered and hence the vertical width of the slider guided by the rail would be reduced. The glass therefore would not be supported completely. In some automobile types, the configuration of the window glass does not match the guide rail.

SUMMARY OF THE INVENTION

It is an object of the present invention to provide a driver unit for use in a window regulator, including a drum for winding a wire therearound, the drum being formed of synthetic resin and having a shank supported stably in place against deformation or breakage.

Another object of the present invention is to provide a driver unit for use in a window regulator, including a drum for winding a wire therearound and a handle shaft, the drum and the handle shaft being securely coupled together to guard against relative angular displacement.

Still another object of the present invention is to provide a driver unit for use in a window regulator, including a spring case accommodating a spiral spring and lockingly mounted on a drum case through a reliable locking arrangement which can be assembled with ease.

According to the present invention, there is provided a driver unit for use in a window regulator for raising and lowering a panel of window glass, including a drum case to be mounted on a fixed member, a drum rotatably supported in the drum case for winding a wire thereon and feeding the wire therefrom upon rotation thereof, the drum having an axial shank, a spiral spring having one end engaging the shank, and a spring cover supported on the drum case and accommodating the spiral spring therein, the other end of the spiral spring being fixed to the spring cover, the shank of the drum being rotatably supported on the spring cover. The spring cover has a central through or bottomed hole in which the shank is inserted. The drum case includes a plate on which the spring cover is mounted and which has a central hole, the shank being rotatably supported in the central hole. A handle shaft has an axial extension extending coaxially through the drum and having a distal end positioned in the central hole in the plate. The spring cover includes a pair of diametrically opposite projections having a pair of lateral arms, the drum case including a plate having a pair of slots, the arms being inserted in each of the slots, one of the arms being held in engagement with one of the longitudinal ends of each the slot under the resiliency of the spiral spring. The arms have a pair of resilient fingers, respectively, engaging a reverse side of the plate. The spring cover has a pair of grooves defined therein and disposed one on each side of each of the projections, one of the grooves receiving a marginal edge portion of the plate adjacent to the slot. The spring cover has a pair of resilient fingers disposed adjacent to the grooves, respectively, and engaging a reverse side of the plate.

Alternatively, the spring cover includes a tongue having a slot, and the drum case has a plate including a projection having a pair of lateral arms, the arms being inserted in the slot, one of the arms being held in engagement with one of longitudinal ends of each the slot under the resiliency of the spiral spring. The plate has a pair of grooves defined therein and disposed one on each side of the projection, one of the grooves receiving a marginal edge portion of the tongue adjacent to the slot.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
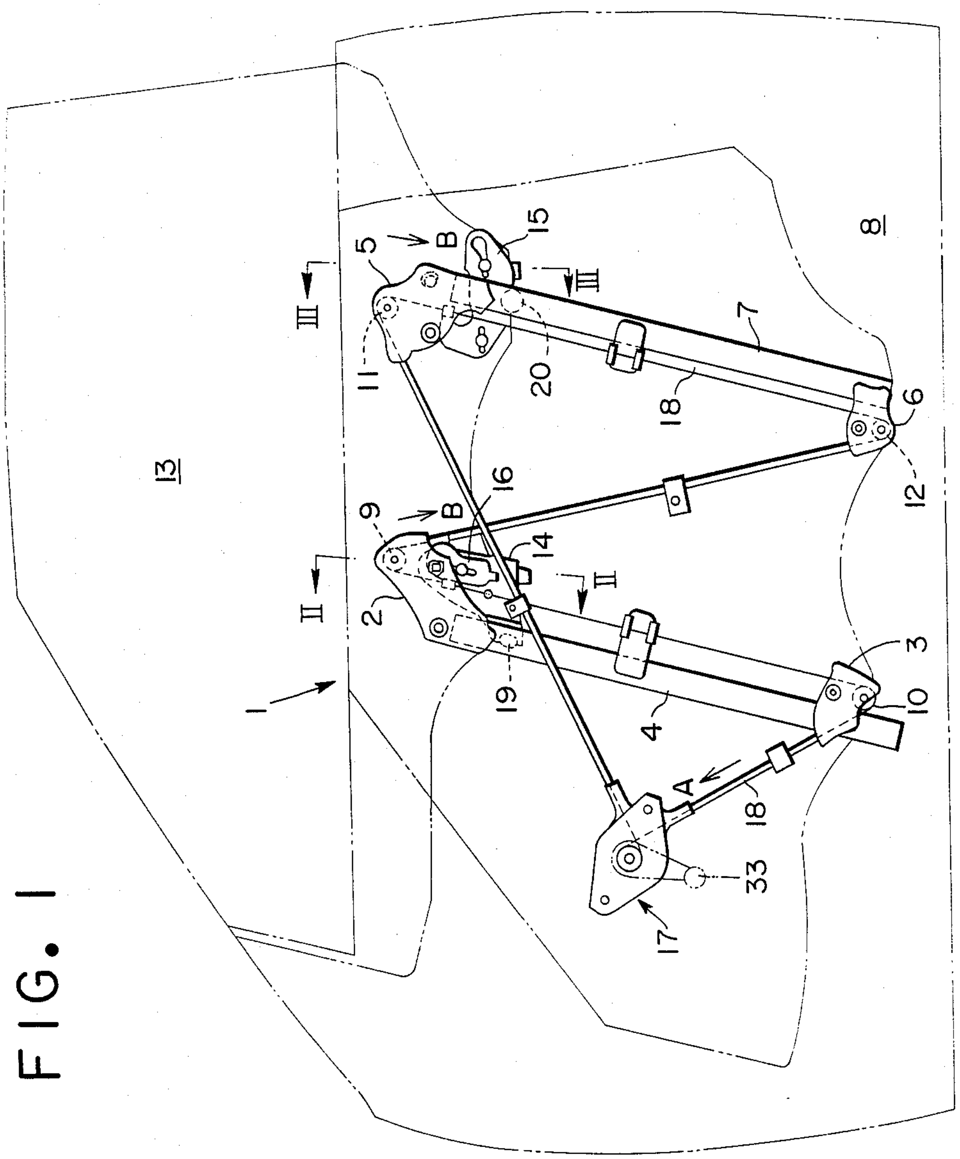
FIG. 1 is a side elevational view of a window regulator employing a crossing wire.
Figure 2:
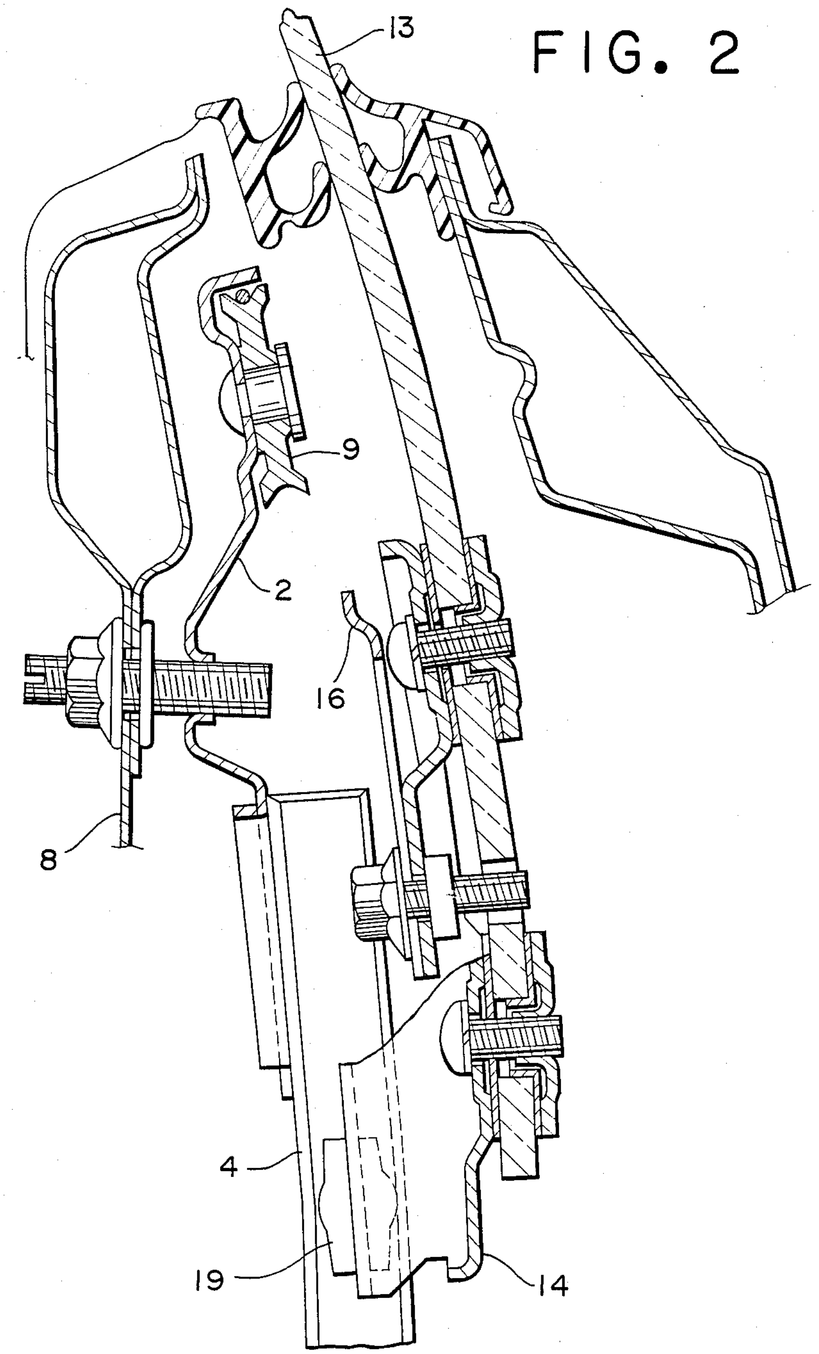
FIG. 2 is an enlarged cross-sectional view taken along line II—II of FIG. 1.
Figure 3:
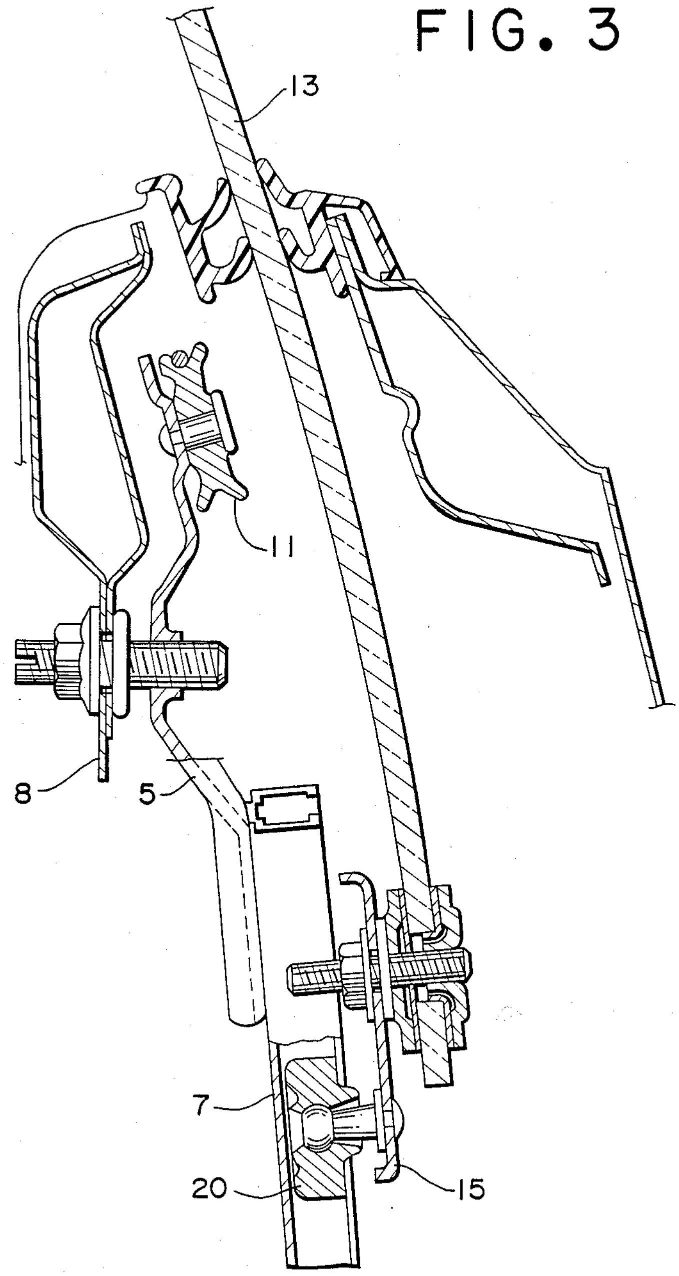
FIG. 3 is an enlarged cross-sectional view taken along line III—III of FIG. 1.

FIGS. 1 through 3 show a window regulator 1 developed by the inventor for use in an automobile door, the window regulator 1 employing a wire for raising and lowering a panel 13 of window glass. As illustrated in FIG. 1, the window regulator 1 includes a front rail 4 having upper and lower brackets 2, 3 and a rear rail 7 having upper and lower brackets 5, 6, the front and rear rails 4, 7 extending substantially parallel to each other and being fixed to an inner door panel 8. Pulleys 9, 10, 11, 12 are rotatably supported by the brackets 2, 3, 5, 6, respectively. The front rail 4 is composed of a structural member having a channel-shaped cross section opening rearwardly of the automobile, and the rear rail 7 comprises a structural member having a channel-shaped cross section opening outwardly of the automobile.

Front and rear glass brackets 14, 15 are bolted to the lower marginal edge of the window glass 13 in spaced relation to each other. To the front glass bracket 14, there is attached a wire holder 16 which is positionally adjustable with respect to the bracket 14. The inner door panel 8 supports thereon a manually-operated or motor-driven driver unit 17 disposed in front of the front rail 4 and having a wire winding barrel or drum (denoted 24 in FIG. 4). An endless or looped wire 18 is trained around the driver unit 17, the pulley 10, the pulley 9, the pulley 12, and the pulley 11. The wire 18 is fixed to the wire holder 16 and the rear glass bracket 15. A front slider 19 which travels in the channel of the front rail 4 is slidably supported on the front glass bracket 14, and similarly a rear slider 20 which travels in the channel of the rear rail 7 is slidably supported on the rear glass bracket 15.

When the wire 18 is pulled by the driver unit 17 in the direction of the arrow A (FIG. 1), the front and rear glass brackets 14, 15 coupled to the wire 18 are subjected to a force in the direction of the arrows B to lower the window glass 13 while the sliders 19, 20 are guided by the rails 4, 7, respectively. The window glass 13 can be raised by pulling the wire 18 in the opposite direction with the driver unit 17. When the window glass 13 is moved upwardly, it is guided substantially in the vicinity of a central portion thereof by the spaced glass brackets 14, 15 and the rails 4, 7. Therefore, the window glass 13 may be designed to have any desired shape.

The window glass 13 is limited in its upward and downward movements and sealed against the door by suitable conventional means.

Figure 4:
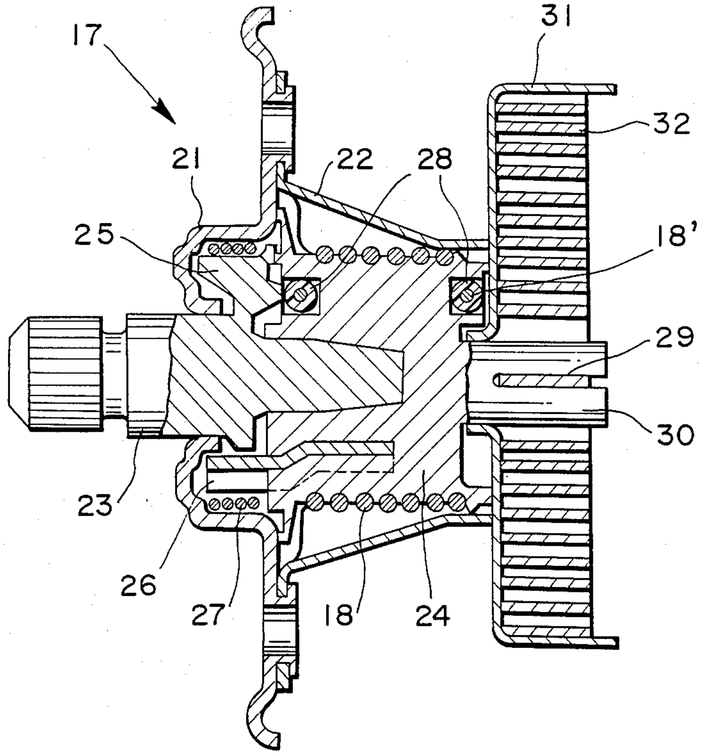
FIG. 4 PRIOR ART
FIG. 4 is a cross-sectional view of a conventional driver unit for use in the window regulator.

As illustrated in FIG. 4, the driver unit 17 comprises a stopper case 21 and a drum case 22 which are fixed to the inner door panel 8 (FIGS. 1 through 3). A handle shaft 23 which is rotatably supported by the stopper case 21 extends coaxially into the drum 24 disposed in the drum case 22 to support the drum 24 therein. The handle shaft 23 includes an integral core 25 projecting radially outwardly toward a side wall portion of the stopper case 21. A plate 26 partially embedded in the drum 24 projects into the stopper case 21 adjacent to the handle shaft 23. When the handle shaft 23 is rotated about its own axis by means of a motor coupled therewith or under a manual force applied thereto, the core 25 is turned around the axis of the handle shaft 23 until it engages the plate 26 whereupon the drum 24 can be rotated in the same direction as the direction in which the handle shaft 23 is rotated. A coiled spring 27 is housed in the stopper case 21 and disposed around the core 25 and the plate 26 for preventing the rotative force from being transmitted from the drum 24 to the handle shaft 23. More specifically, when under the rotative force applied from the drum 24, the coiled spring 27 is spread radially outwardly into intimate contact with the inner peripheral wall surface of the stopper case 21 to resist the applied rotative force. Conversely, when under the rotative force applied by the handle shaft 23, the coiled spring 27 is contracted radially outwardly out of contact with the inner peripheral wall surface of the stopper case 21. Therefore, the coiled spring 27 thus positioned constitutes a spring coupling mechanism for transmitting the rotative force from the handle shaft 23 to the drum 24 and for cutting off the rotative force from the drum 24 to the handle shaft 23.

The wire 18 is encased in wire sheaths 18' having ends disposed in grooves 28 defined in the axially opposite ends of the drum 24, the wire 18 being wound as several turns around the drum 24. The drum 24 includes a coaxial shank 30 having a slot 29 defined therein. Joined integrally to the drum case 22 is a spring case 31 accommodating a spiral spring 32 therein, the spiral spring 32 having one end fixed to the spring case 31 and an opposite movable end inserted in the slot 29 in the shank 30. When the window glass 13 is being raised, the spiral spring 32 is wound up to store the energy; when the window glass 13 is being lowered, the spiral spring 32 is unwound to assist in rotating the drum 24 under the stored energy, thus facilitating the rotation of the handle shaft 23.

Figure 5:
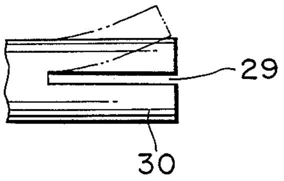
FIG. 5 PRIOR ART
FIG. 5 is a view of the shaft of the conventional driver unit, indicating the manner in which the shaft is broken.

In operation, when a handle 33 (FIG. 1) coupled to the handle shaft 23 is rotated in a direction to lower the window glass 13, the core 25 of the handle shaft 23 is brought into engagement with the plate 26 to rotate the drum 24. The drum 24 then pulls the wire 13 in the direction of the arrow A (FIG. 1) to lower the window glass 13. At this time, the spiral spring 32 is wound to store up energy. Even when the drum 24 is subjected to an external rotative force after the window glass 13 is lowered, the applied rotative force is not transmitted from the drum 24 to the handle shaft 23 because of the spring 27, and the stored energy of the wound spiral spring 32 is not released. When the handle 33 is rotated in the opposite direction, the drum 24 is rotated in the opposite direction to feed the wire 18 in the direction opposite that of the arrow A to thereby raise the window glass 13. Since the spiral spring 32 is unwound at this time to aid in rotating the drum 24, the handle 33 is not subjected to a strong resistive force which would otherwise be imposed by the weight of the window glass 13 and the frictional forces of the wire 18, the window glass 13 and other components.

Where the drum 24 is made of synthetic resin, the slotted shank 30 is liable to be deformed or broken as indicated by the two-dot-dash lines in FIG. 5 under the reactive force from the spiral spring 32. One solution would be to construct the drum 24 of metal for increasing the mechanical strength of the shank 30. However, this approach would result in a heavier driver unit 17.

Furthermore, the spring case 31 shown in FIG. 4 has an open side through which water tends to be trapped between the turns of the spiral spring 32. When the trapped water freezes, the spiral spring 32 cannot be wound or unwound as required for smooth operation of the window regulator. Japanese Utility Model Publication No. 49-2336 discloses a spring cover screwed to the spring case for closing the open side thereof.

Figure 6:
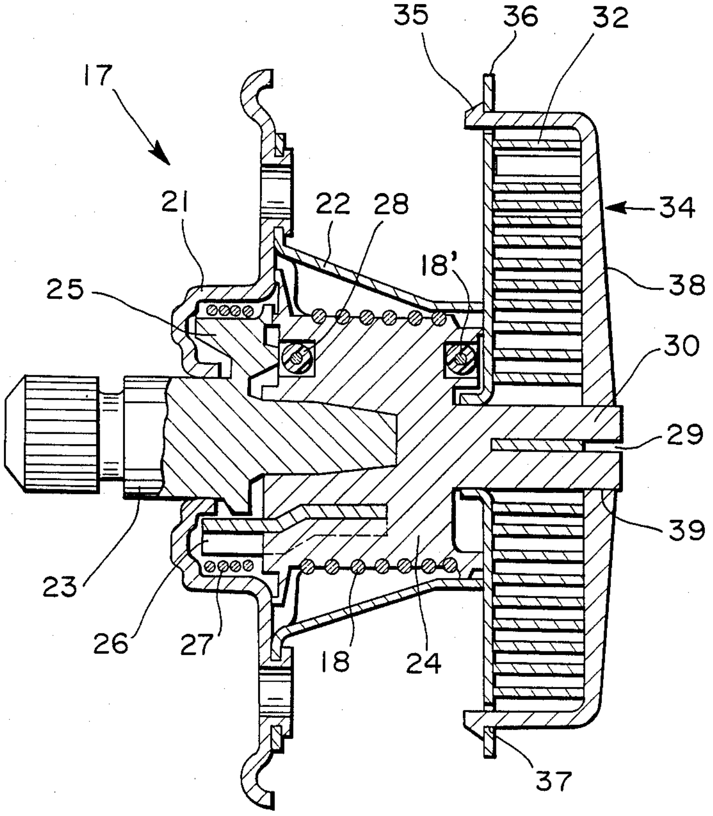
FIG. 6 is a cross-sectional view of a driver unit of the invention for use in the window regulator.
Figure 7:
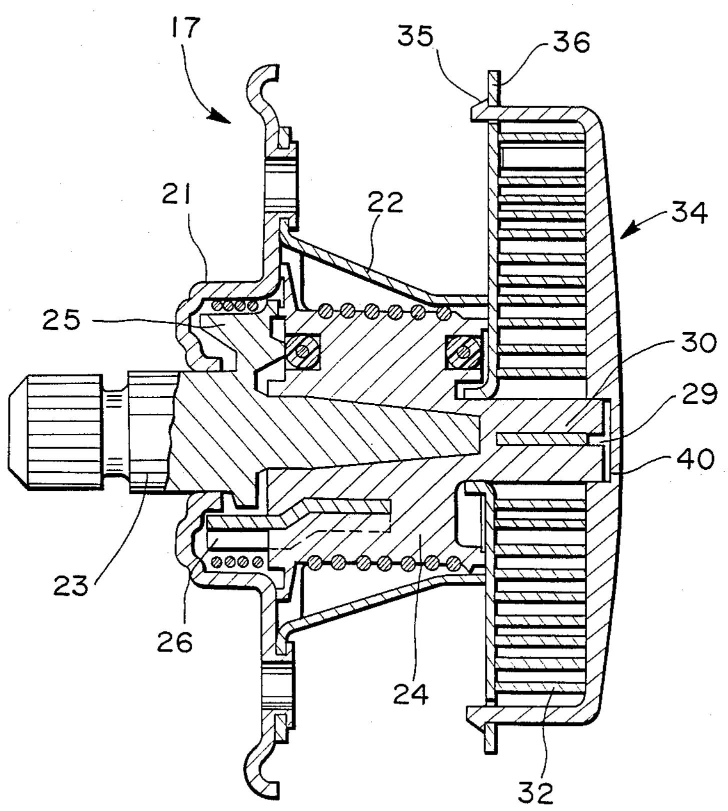
FIG. 7 is a cross-sectional view of another driver unit for use in the window regulator.

According to the present invention, the spring cover as disclosed in Japanese Utility Model Publication No. 49-2336 is employed to overcome the aforesaid drawbacks of the conventional driver unit. FIGS. 6 and 7 show driver units according to respective embodiments of the present invention. Those parts in FIGS. 6 and 7 which are identical or correspond to those shown in FIG. 4 are denoted by identical or corresponding reference characters. As shown in FIG. 6, a circular spring cover 34 includes an annular outer peripheral wall having a pair of diametrically opposed locking hooks 35 resiliently snapped respectively in slots 37 defined in a plate 36 of the drum case 22. The spring cover 34 thus supported on the drum case 22 has a top wall 38 with its central portion thickened and having a central through-hole 39. The shank 30 of the drum 24 is inserted through the central hole 39 in the top wall 38 to guard against transverse deformation as shown in FIG. 5. According to another embodiment shown in FIG. 7, the spring cover 34 has a central bottomed hole 40 in which the tip end of the shank 30 is inserted. With the arrangements illustrated in FIGS. 6 and 7, the spring cover 34 can easily be attached and centered with respect to the drum 24 simply by snapping the locking hooks 35 in the slots 37 and inserting the shank 30 in the through-hole 39 or the bottomed hole 40. Since the shank 30 is supported by the drum case 22 and the spring cover 34, the drum 24 will not be displaced under the reactive force of the spiral spring 32, and the drum 24 can stably be maintained for rotation about a stable axis. With the drum 24 prevented from undergoing undesired displacement and the shank 30 prevented from undergoing transverse deformation, the drum 24 can be formed of synthetic resin and the spiral spring 32 can be wound or unwound in a fixed direction to store and release its energy under stable conditions. The drum 24 of synthetic resin does not wear rapidly and produces no undue noise upon vibration since it is kept out of undesired contact with the drum case 22.

Figure 8:
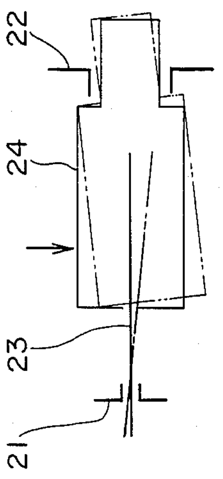
FIG. 8 PRIOR ART
FIG. 8 is a schematic view showing the manner in which the conventional driver unit operates.

The prior driver unit 17 as shown in FIG. 4 has another problem. As shown in FIG. 8, the handle shaft 23 is rotatably supported by the stopper case 21, and the drum 24 is rotatably supported by the drum case 22. When the window regulator is in operation, the wire is subjected to the weight of the window glass and the frictional forces of the window glass and other members, imposing a force on the drum 24 in the direction of the arrow in FIG. 8. Therefore, the drum 24 and the handle shaft 23 tend to turn aside about their pivots. With the drum 24 and the handle shaft 23 thus angularly displaced, the handle when operated to rotate the handle shaft 23 about its axis is caused to make elliptical motion, requiring an increased force to rotate the handle. The drum 24 may contact the inner peripheral wall surface of the drum case 22. When this occurs, the force required to rotate the handle should be increased.

Figure 9:
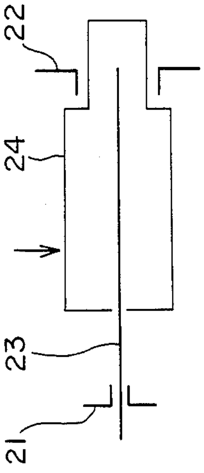
FIG. 9 is a schematic view illustrating the principles of a driver unit of the present invention.

According to the present invention, as illustrated in FIG. 9, the handle shaft 23 is substantially supported by the stopper case 21 and the drum case 22. The drum 24 is in turn supported by the drum case 22 and the handle shaft 23 is supported in the above manner. As a result, the drum 24 is prevented from being tilted or displaced as indicated by the two-dot-dash lines in FIG. 8, and hence the handle shaft 23 and the drum 24 can be rotated about an axis which is kept constant at all times.

Figure 10:
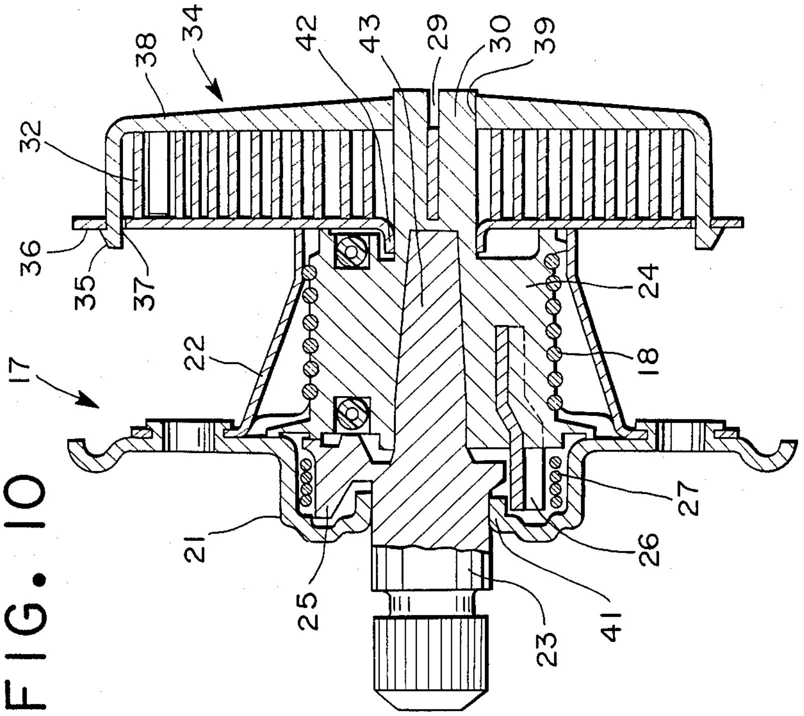
FIG. 10 is a cross-sectional view of still another driver unit of the present invention.

FIG. 10 shows a driver unit according to still another embodiment of the present invention, the driver unit being constructed on the basis of the principles shown in FIG. 9. Those parts in FIG. 10 which are identical or correspond to those shown in FIGS. 4, 6 and 7 are denoted by identical or corresponding reference characters. The handle shaft 23 is rotatably supported in a central hole 41 defined in the stopper case 21. The shank 30 of the drum 24 is rotatably supported in a central hole 42 defined in the plate 36 of the drum case 22. The handle shaft 23 has an axial extension 43 inserted coaxially through the drum 24 and having its distal end positioned in the central hole 42 in the drum case 22. The axial extension 43 is cylindrical in shape and tapered toward the distal end thereof. The tapered extension 43 is advantageous in that when the handle shaft 23 is formed as of zinc in a die casting process, it can easily be pulled out of the die and can be used as it is without being machined. The handle shaft 23 that is not machined retains a hard surface layer which is conducive to increased mechanical strength. Since the drum 24 is stably supported by the handle shaft extension 43, the drum 24 is free from physical interference with the drum case 22, and the drum case 22 can be positioned as closely to the drum 24 as possible. Therefore, the driver unit may be small in size. Inasmuch as the handle shaft 23 is firmly supported by the stopper case 21 and deeply inserted in the drum 24, the handle shaft 23 is sufficiently securely supported so that the driver can open or close the door by gripping the handle without impairing the driver unit.

Figure 11:
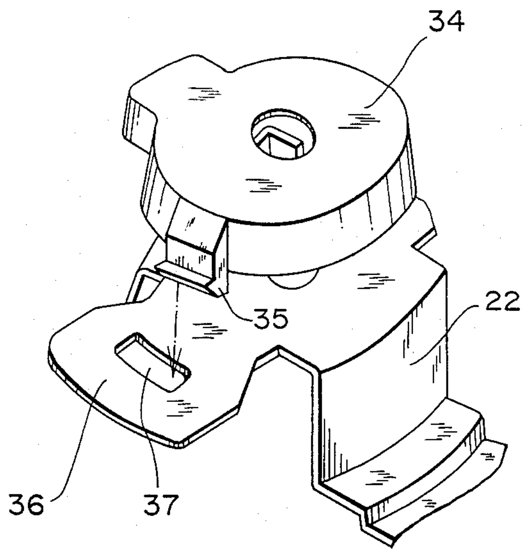
FIG. 11 is perspective view of a spring case of the driver unit, showing a general locking arrangement.
Figure 12:
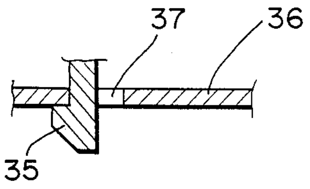
FIG. 12 is an enlarged fragmentary cross-sectional view of the locking arrangement shown in FIG. 11.

FIGS. 11 and 12 show in perspective the locking arrangement as illustrated in FIGS. 6, 7 and 10 for lockingly connecting the spring cover 34 to the plate 36 of the drum case 22. Although the locking hook 35 can easily be snapped into the corresponding slot 37 to attach the spring cover 34 to the plate 36, the locking hook 35 has only a small surface engaging an edge of the slot 37, as shown in FIG. 12. The locking hook 35 is liable to be worn off upon insertion into the slot 37, and may be forced off the slot 37 owing to undue vibration or external forces applied thereto.

FIGS. 13 through 25 show various locking arrangements according to embodiments of the present invention. Identical or corresponding parts are denoted by identical or corresponding reference characters throughout these views.

Figure 13:
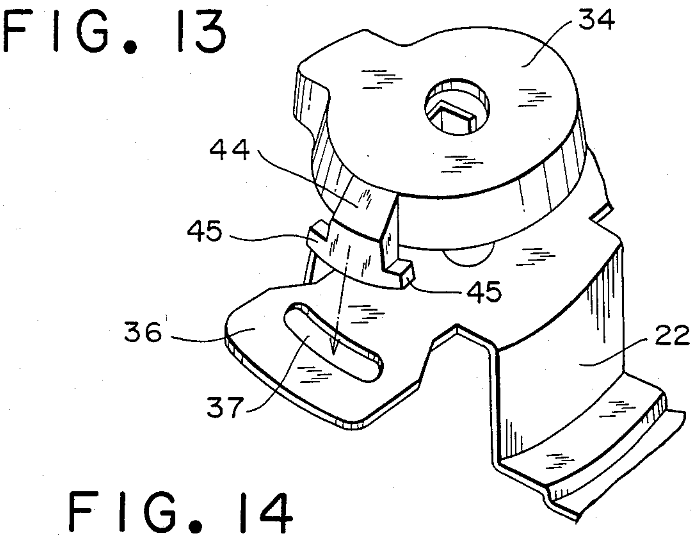
FIG. 13 a perspective view of a spring case locking structure according to the present invention.
Figure 14:
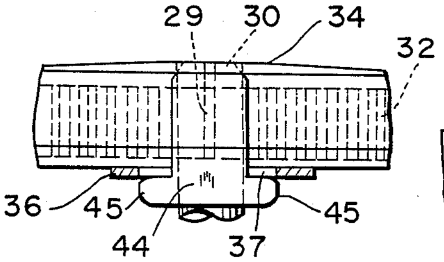
FIGS. 14 and 15 are fragmentary side-elevational views, partly in cross section, of the spring case locking structure illustrated in FIG. 13.
Figure 15:
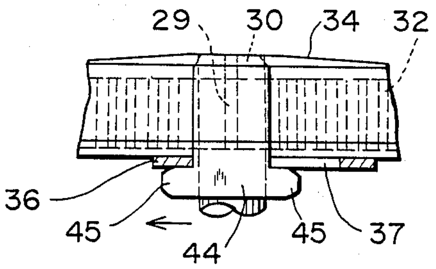

FIGS. 13 through 15 illustrate a locking arrangement according to the present invention. The spring cover 34 has a pair of diametrically opposed projections 44 (only one shown) each having on its distal end a pair of opposing arms 45 extending in the circumferential direction of the spring cover 34. The slot 37 defined in the plate 36 has a length slightly larger than the distance between the free ends of the arms 45 to facilitate insertion of the arms 45 into the slot 37. With the spiral spring 32 wound in the spring cover 34, the arms 45 are manually inserted into the slot 37 and then the spring cover 34 is released of the hand. The spring cover 34 is now turned in the direction of the arrow (FIG. 15) with respect to the drum case 22 under the resiliency of the spiral spring 32 until one of the arms 45 engages an end of the slot 37. The outer peripheral edge of the slot 37 and the outer peripheral surface of the projection 44 are aligned with each other in concentric relation to the shank 30, thus positioning the spring cover 34 radially with respect to the plate 36.

Figure 16:
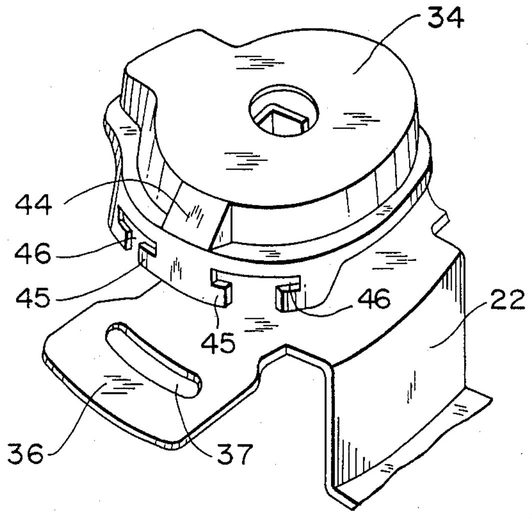
FIG. 16 is a perspective view of another spring case locking structure.
Figure 17:
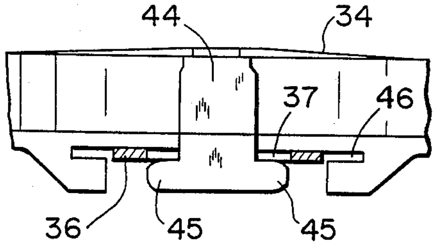
FIGS. 17 and 18 are fragmentary side-elevational views, partly in cross section, of the spring case locking structure of FIG. 16.
Figure 18:
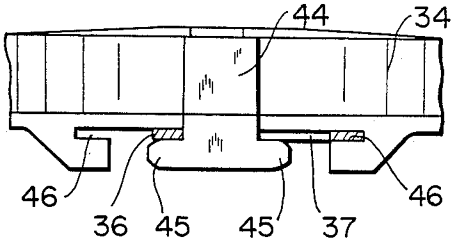

FIGS. 16 through 18 show a locking structure according to another embodiment of the present invention. The spring cover 34 has a pair of grooves 46 defined in spaced confronting relation to the arms 45 of each projection 44 in the circumferential direction of the spring cover 34. In assembly, the arms 45 are inserted into the slot 37 as shown in FIG. 17, and then the spring cover 34 is released to cause one of the arms 45 to engage an end of the slot 37 and also to cause a marginal edge portion of the plate 36 adjacent to the slot 37 to fit into the corresponding groove 46 under the resilient force of the spiral spring 32, as shown in FIG. 18. The spring cover 34 is therefore supported more securely on the plate 36.

Figure 19:
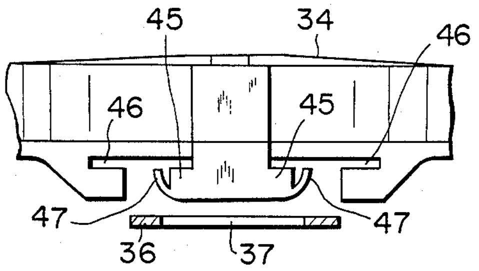
FIGS. 19 through 21 are fragmentary side-elevational views, partly in cross section, of still another spring case locking structure.
Figure 20:
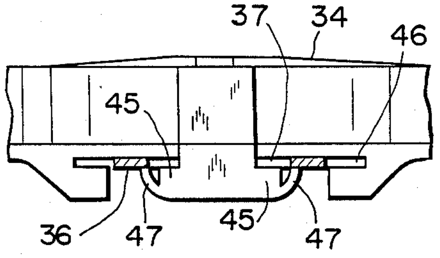
Figure 21:
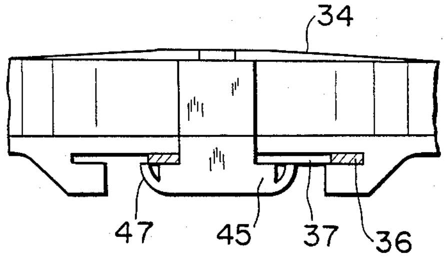

According to still another embodiment shown in FIGS. 19 through 21, the arms 45 have resilient fingers 47 projecting obliquely upwardly toward the spring cover 34. The fingers 47 have opposite ends spaced from each other by a distance larger than the length of the slot 37. The other details are the same as those of the structure shown in FIGS. 16 through 18. When the arms 45 are inserted into the slot 37 by hand, the resilient fingers 47 are first elastically deformed toward each other, and once they clear the slot 37, their ends are held against the reverse side of the plate 36 as shown in FIG. 20. Therefore, the arms 45 cannot easily be pulled out of the slot 37 in the position shown in FIG. 20. When the spring cover 34 is released of the hand, it is resiliently displaced to the position of FIG. 21 in which the spring cover 34 is lockingly mounted on the plate 36.

Figure 22:
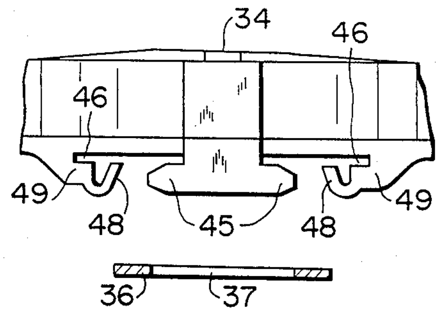
FIGS. 22 through 24 are fragmentary side-elevational views, partly in cross section, of yet still another spring case locking structure.
Figure 23:
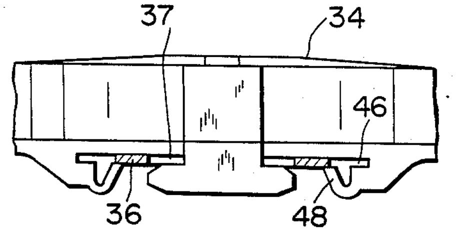
Figure 24:
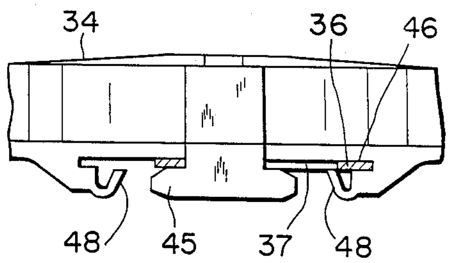

FIGS. 22 through 24 show a still further embodiment in which resilient fingers 48 are formed respectively on projections 49 of the spring cover 34 which define the grooves 46, respectively, the fingers 48 extending obliquely upwardly toward the spring cover 34. When the arms 45 are inserted into the slot 37 as shown in FIG. 23, the ends of the fingers 48 are held against the reverse side of the plate 36 to keep the spring cover 34 and the plate 36 together.

Figure 25:
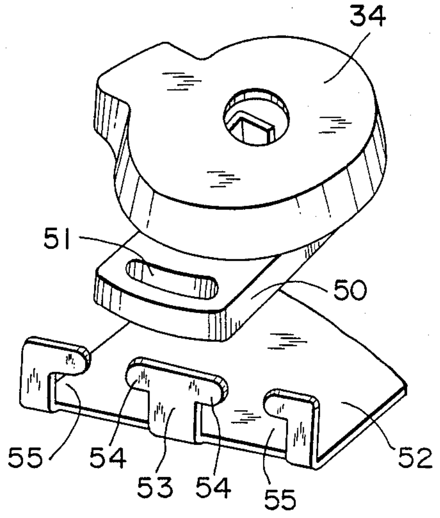
FIG. 25 is a perspective view of a still further spring case locking structure.

As shown in FIG. 25, the spring cover 34 may have a tongue 50 having a slot 51, and the drum case may have a plate 52 including a projection 53 having a pair of lateral arms 54, there being a pair of grooves 55 defined one on each side of the projection 53. In assembly, the arms 54 are inserted into the slot 51, and upon release of the spring cover 34, the tongue 50 is locked in position by one of the arms 54 and one of the grooves 55. Where the direction in which the spring cover 34 as released is turned is known, one of the arms 54 and one of the grooves 55 may be omitted.

With the locking arragements shown in FIGS. 13 through 25, the spring cover is firmly held in locking engagement with the drum case under the resilient force of the spiral spring disposed in the spring cover. As the arms can be increased in thickness and have a large engagement surface, the arms are securely locked in position on the companion plate. The spring cover can easily be mounted on the drum case simply by inserting the arms and releasing the spring cover. The locking arrangements of the present invention can be employed in seat belt takeup devices.

Although certain preferred embodiments have been shown and described, it should be understood that many changes and modifications may be made therein without departing from the scope of the appended claims.

What is claimed is:

1. A driver unit for use in a window regulator having a wire coupled to a panel of window glass for raising and lowering the same, comprising:

(a) a handle shaft rotatably mounted on a fixed member and having an axial extension;

(b) a drum supported on said axial extension of said handle shaft for winding the wire thereon and unwinding the wire therefrom upon rotation of said handle shaft, said drum including a shank extending axially from said drum, said shank having an outer end face and a spring slot opening out of said outer end face;

(c) a drum case having one end adapted to be mounted on said fixed member and another end including a plate, said plate having a central hole for bearing said shank of said drum, said axial extension of said handle shaft having a distal end passing through said central hole;

(d) a spiral spring having one end disposed in and engaging said spring slot of said shank; and a spring cover supported on said drum case and accomdating said spiral spring therein, the other end of said spiral spring being fixed to said spring cover, said spring cover having a bearing portion rotatably supporting and engaging said shank adjacent said outer end face to restrain deformation of said spring slot.

2. A driver unit according to claim 1, wherein said bearing portion of said spring cover includes a central through-hole in which said end face of said shank is inserted.

3. A driver unit according to claim 1, wherein said bearing portion of said spring cover includes a central bottomed hole in which said end face of said shank is inserted.

4. A driver unit for use in a window regulator having a wire coupled to a panel of window glass for raising and lowering the same, comprising:

(a) a handle shaft rotatably mounted on a fixed member and having an axial extension;

(b) a drum supported on said axial extension of said handle shaft for winding the wire thereon and unwinding the wire therefrom upon rotation of said handle shaft, said drum including a shank extending axially from said drum, said shank having an outer end face and a spring slot opening out of said outer end face;

(c) a drum case having one end adapted to be mounted on said fixed member and another end including a plate, said plate having a central hole for bearing said shank of said drum and said extension of said handle shaft having a distal end passing through said central hole, said plate further having at least one slot elongated circumferentially with respect to said shank and a pair of peripheral edge portions on circumferentially opposite sides of said slot;

(d) a spiral spring having one end disposed in and engaging said spring slot of said shank; and (e) a spring cover detachably supported on said drum case and accomodating said spiral spring therein, the other end of said spiral spring being fixed to said spring cover, said spring cover including a bearing portion rotatably supporting and engaging said shank adjacent said outer end face to restrain deformation of said spring slot, said spring cover including at least one projection having a pair of circumferentially opposed arms insertable into said slot of said plate and a first groove between each of said arms and said spring cover, said spring cover further including a pair of second grooves on circumferentially opposed sides of said projection, one of said peripheral edge portions of said plate being received by one of said first grooves and the other of said peripheral edge portions being received by one of said second grooves upon rotation of said spring cover relative to said drum case at times when said arms are inserted into said slot, said spring cover further including a resilient finger disposed adjacent each of said first grooves, one of said fingers engaging said peripheral edge portion of said plate when said peripheral edge portion is received in said respective first groove.

5. A driver unit for use in a window regulator having a wire coupled to a panel of window glass for raising and lowering the same, comprising:

(a) a handle shaft rotatably mounted on a fixed member and having an axial extension;

(b) a drum supported on said axial extension of said handle shaft for winding the wire thereon and unwinding the wire therefrom upon rotation of said handle shaft, said drum including a shank extending axially from said drum, said shank having an outer end face and a spring slot opening out of said outer end face;

(c) a drum case having one end adapted to be mounted on said fixed member and another end including a plate, said plate having a central hole for bearing said shank of said drum and said extension of said handle shaft having a distal end passing through said central hole, said plate further having at least one slot elongated circumferentially with respect to said shank and a pair of peripheral edge portions on circumferentially opposite sides of said slot;

(d) a spiral spring having one end disposed in and engaging said spring slot of said shank; and (e) a spring cover detachably supported on said drum case and accomodating said spiral spring therein, the other end of said spiral spring being fixed to said spring cover, said spring cover including a bearing portion rotatably supporting and engaging said shank adjacent said outer end face to restrain deformation of said spring slot, said spring cover including at least one projection having a pair of circumferentially opposed arms insertable into said slot of said plate and a first groove between each of said arms and said spring cover, said spring cover further including a pair of second grooves on circumferentially opposed sides of said projection, one of said peripheral edge portions of said plate being received by one of said first grooves and the other of said peripheral edge portions being received by one of said second grooves upon rotation of said spring cover relative to said drum case at times when said arms are inserted into said slot, said spring cover further including a resilient finger disposed adjacent each of said second grooves, one of said fingers engaging said peripheral edge portion of said plate when said peripheral edge portion is received in said respective second groove.

* * * * *